United States Patent
Weston

(10) Patent No.: US 8,781,259 B2
(45) Date of Patent: Jul. 15, 2014

(54) RE-SAMPLING METHOD AND APPARATUS

(71) Applicant: Snell Limited, Reading (GB)

(72) Inventor: Martin Weston, Petersfield (GB)

(73) Assignee: Snell Limited, Reading, Berkshire (GB)

( * ) Notice: Subject to any disclaimer, the term of this patent is extended or adjusted under 35 U.S.C. 154(b) by 135 days.

(21) Appl. No.: 13/652,225

(22) Filed: Oct. 15, 2012

(65) Prior Publication Data

US 2013/0094782 A1    Apr. 18, 2013

(30) Foreign Application Priority Data

Oct. 14, 2011  (GB) .................................. 1117806.8

(51) Int. Cl.
*G06K 9/32*   (2006.01)

(52) U.S. Cl.
USPC ........................................ 382/300; 708/313

(58) Field of Classification Search
USPC ......... 375/E7.099, E7.145, E7.253; 382/300; 386/271; 708/290, 313, 847
See application file for complete search history.

(56) References Cited

U.S. PATENT DOCUMENTS

| 7,554,553 B2 * | 6/2009 | MacInnis et al. ............. 345/589 |
| 2002/0141499 A1 * | 10/2002 | Goertzen ................. 375/240.12 |
| 2003/0077000 A1 * | 4/2003 | Blinn et al. .................... 382/260 |

FOREIGN PATENT DOCUMENTS

| GB | 2418092 | 3/2006 |
| GB | 2460069 | 11/2009 |

OTHER PUBLICATIONS

Great Britain Search Report for Great Britain Application No.1117806.8 dated Jan. 30, 2012.

* cited by examiner

*Primary Examiner* — Gregory F Cunningham
(74) *Attorney, Agent, or Firm* — Pearl Cohen Zedek Latzer Baratz LLP

(57) ABSTRACT

An image or other sample processor has a resampling filter adapted to provide output samples at an output sampling frequency which can be selected to be higher or lower than the input sampling frequency. The width of the resampling filter aperture is scaled according to either the input sampling frequency or the output sampling frequency so as to obtain the wider of the two possible filter apertures.

17 Claims, 9 Drawing Sheets

RE-SAMPLING METHOD AND APPARATUS

This application claims priority from Great Britain Patent Application No. 1117806.8, filed Oct. 14, 2011, which is hereby incorporated by reference.

FIELD OF INVENTION

This invention concerns interpolation and decimation of sampled data and especially to image processing involving interpolation and decimation of sampled data.

BACKGROUND OF THE INVENTION

Interpolation and decimation of sampled data is frequently necessary. A very common example is the 're-scaling' of all or part of digitally-represented television images in a digital video effects (DVE) processor forming part of a vision mixer (or 'production switcher').

In a DVE it is highly advantageous to vary the portrayed size (and/or shape) of all or part of an image smoothly from an enlarged representation to a shrunken representation, or vice versa. This is achieved by increasing the number of spatial image samples by interpolation when enlargement is needed, and reducing the number of samples by decimation when shrinking is needed. The degree of interpolation or decimation depending, of course, on the degree of enlargement or shrinking required.

Patent GB 2 418 092 describes a convenient decimation architecture in which an input to be decimated is connected in parallel to a fixed number of coefficient multipliers whose outputs are respectively connected to members of a serially-connected, fixed-length chain of accumulators. Accumulated values are passed along the chain at the required, decimated output rate, and the decimation factor can be varied by changing the number of times that weighted input samples from the multipliers are accumulated. However, this architecture does not permit interpolation and so a process that is required to either interpolate or decimate at will (and smoothly change from interpolation to decimation) requires an additional interpolator, having its output co-timed with the decimator output, and means to take the output from either the interpolator or the decimator. The present invention provides an effective solution to this problem.

The invention is applicable to any type of sampled data. Typically it is applied to spatially or temporally sampled data. In this specification the terms sample (or sampling) frequency, sample pitch and sample phase will be used. Sampling frequency, or sampling rate, is the number of samples that represent some fixed quantity of data. Where spatial sampling is used the frequency will be a spatial frequency, for example samples per active picture width. Where temporal sampling is used the frequency will be samples per second. Sample pitch is the distance between adjacent samples; this is the reciprocal of the sampling frequency. In the case of spatial sampling the pitch is a distance, for example a fraction of the length of an active television line. In the case of temporal sampling the sample pitch is the time period between successive sampling instants. A particular sample phase value represents: a particular point, for spatial sampling; or, a particular instant, for temporal sampling. The skilled person will appreciate that, in the description which follows, the terms 'time' and 'frequency' may relate to analogous spatial or temporal processes.

The principle of the invention enables a sequence of sample values that represents some quantity, for example a set of luminance values for pixels of an image, to be processed to obtain a modified sequence having fewer or more sample values.

It is helpful, first, to review briefly the known art of interpolation and decimation. FIG. 1 shows how an arbitrarily-positioned, new output sample (1) is constructed from a sequence of input samples (2) by forming its value from a weighted sum of the values of input samples that fall within a filter aperture centred on the position of the new output sample. In the Figure, the sequence of samples is shown horizontally from left to right; vertically aligned features in the figure have the same sampling phase. The positions of input samples are shown by crosses, individual input samples are identified by upper-case letters and the output sample position is shown by a small circle. The filter aperture centred on the output sample (1) is indicated by the brace (3).

In the illustrated example the filter aperture encompasses input samples A to F inclusive, and the value of the output sample (1) is formed from a weighted sum of the values of these input samples:

$$A \cdot \alpha(\phi_A) + B \cdot \alpha(\phi_B) + C \cdot \alpha(\phi_C) + D \cdot \alpha(\phi_D) + E \cdot \alpha(\phi_E) + F \cdot \alpha(\phi_F)$$

Where: $\alpha(x)$ is the filter aperture function so that the value of the function is the weight, and the argument x of the function is the phase of the sample to be weighted; and, $\phi_n$ is the phase of input sample n with respect to the aperture position.

Note that, as will be explained below, a wider or narrower filter aperture may be chosen as more appropriate for a particular application.

FIG. 2 shows an exemplary filter aperture. The horizontal (x) axis represents input sample phase relative to the required output sample position. The vertical (y) axis represents the filter coefficient value at a particular input sample phase. The coefficient value at the output sample position is shown as unity, but, as the skilled person will appreciate, the whole aperture magnitude may be normalised to achieve a required gain for the resampling process. The phase axis is calibrated in units of aperture width relative to the output sample position, where the aperture width is the range of phase values outside which the value of the aperture function is zero. Thus the start position of the aperture, (4) in FIG. 1, has the phase value $-\frac{1}{2}$; the finishing position of the aperture, (5) in FIG. 1, has the phase value $+\frac{1}{2}$; and, the output sample position, (1) in FIG. 1, has the phase value zero.

As is well-known, the filter aperture function is chosen to avoid aliasing. The required aperture function is the impulse response of a filter that attenuates any alias components to an acceptably low level. According to the well-known principles of FIR filter design, the width of a filter aperture is a compromise between: the number of samples included in the aperture (a larger number requires more contribution weights to be evaluated and summed); and, the maximum rate of cut of the filter with respect to input frequency, and the flatness of the passband (a wider aperture allowing sharper cut and flatter response). The skilled person will thus choose an appropriate aperture width for a particular resampling process according to the respective input and output sampling frequencies and the relative acceptability of aliasing and distortion of the wanted signal frequency spectrum. Usually the aperture width is an integral number of input sample pitches, as this simplifies evaluation of the input sample phase values, and hence the determination of the respective sample weights.

SUMMARY OF THE INVENTION

The invention consists in a method and apparatus for finding values for arbitrarily-positioned, new output samples from the values of a stream of input samples according to a specified temporal or spatial relationship between input sample positions and output sample positions by summing weighted values of input samples situated within a filter aperture such that the weight applied to the value of each input sample depends on the phase of that input sample within the said filter aperture, and the relationship between the said input sample phase and the said weight is defined by a filter aperture function in which the value of the function is the said weight and the argument of the function is the said phase characterised in that:

the width of the said filter aperture is scaled according to either the input sampling frequency or the output sampling frequency so as to obtain the wider of the two possible filter apertures.

Suitably the argument of the aperture function is obtained by taking the numerically smaller value of:

the distance in input sample pitches between the position with respect to the input samples of the contributing input sample and the position with respect to the input samples of the output sample receiving the respective contribution and the distance in output sample pitches between the position with respect to the output samples of the contributing input sample and the position with respect to the output samples of the output sample receiving the respective contribution.

In certain embodiments the said the distance in output sample pitches between the position of the contributing input sample and the position of the output sample receiving the respective contribution is determined as the difference between the output sample position and the required output sample position determined from the position of the contributing input sample according to the said specified temporal or spatial relationship between input sample positions and output sample positions.

In certain embodiments the said the distance in input sample pitches between the position of the contributing input sample and the position of the output sample receiving the respective contribution is determined as the difference between the input sample position and the required input sample position determined from the position of the output sample receiving the contribution according to the said specified temporal or spatial relationship between input sample positions and output sample positions.

Advantageously data values representing the said specified temporal or spatial relationship between input sample and output sample positions are interpolated so as to obtain intermediate sample positions between specified sample positions.

In a preferred embodiment contributions of input sample values to output sample values are accumulated in members of a serially-connected fixed-length chain of accumulators.

BRIEF DESCRIPTION OF THE DRAWINGS

An example of the invention will now be described with reference to the drawings in which.

DETAILED DESCRIPTION OF THE INVENTION

In a resampling process that is an interpolation process, there are more interpolated output samples than input samples, and so the output sampling structure can represent a wider range of frequencies than the input sampling structure. (The Nyquist frequency is higher for the output sample rate.) This wider bandwidth may include alias components due to the repeat (due to the input sampling) of the input signal spectrum. Thus the interpolation filter's stop-band should start, at least, at the Nyquist frequency for the input sample rate.

In a resampling process that is a decimation process, there are fewer decimated output samples than input samples. The lower-frequency output sample structure has a lower Nyquist frequency than the input structure and cannot support such a wide bandwidth without aliasing. The decimation filter must therefore be chosen to cut off, at least, at the Nyquist frequency for the output sample rate. Thus, the required filter cut-off frequency for an interpolation process depends on the sampling frequency of the input samples; and, for a decimation process, the required filter cut-off frequency depends on the sampling frequency of the decimated output samples. In each case, a lower sampling frequency requires a lower filter cut-off frequency and vice versa.

The frequency response of an FIR filter can be scaled in the frequency domain by scaling its filter aperture function in the time domain. If the filter aperture is made wider, then the frequency response is made narrower; and if the filter aperture is made narrower, then the frequency response is made wider. This follows from that fact that the aperture function defines the filter's impulse response; narrowing the impulse response so that it takes less time, raises the frequencies of the Fourier components of the response.

Figure 3:
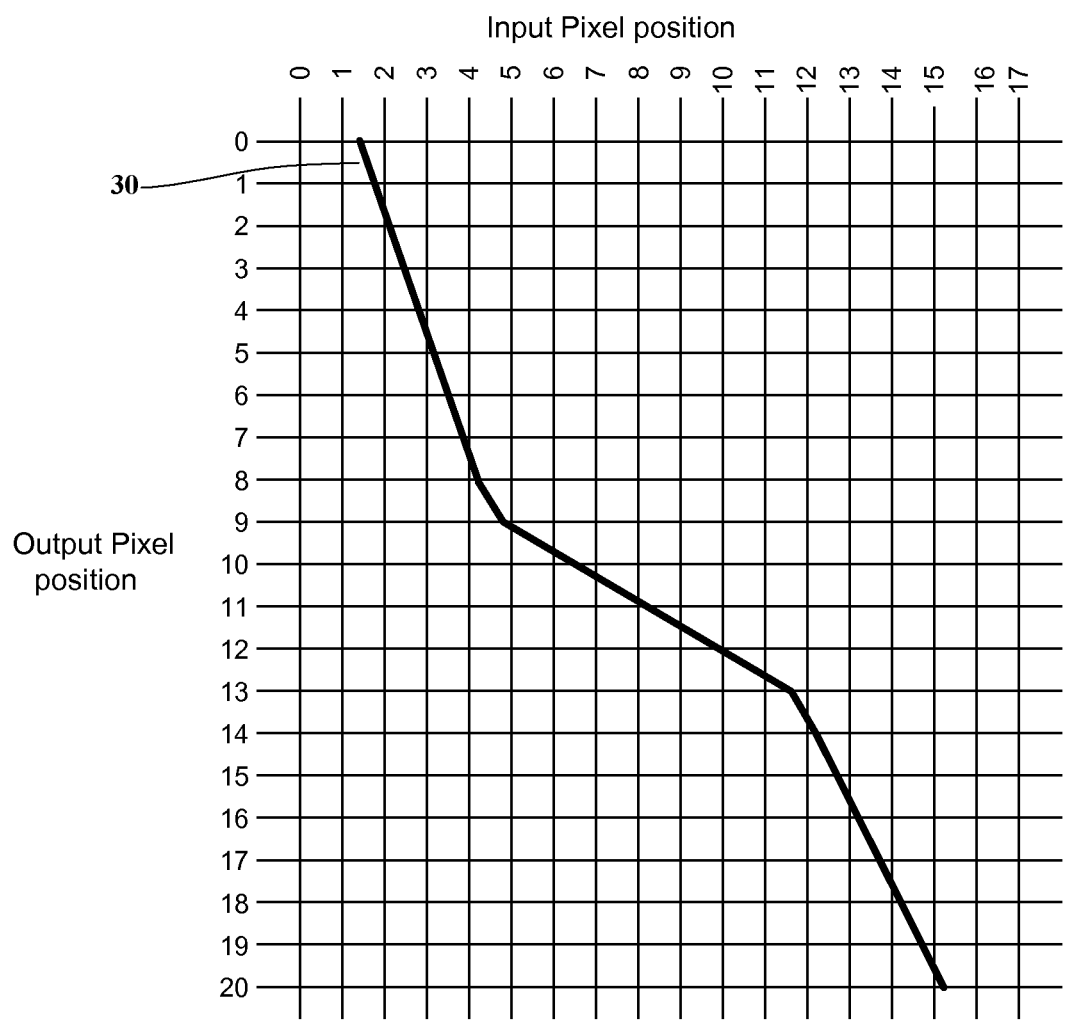
FIG. 3 shows a graph of the relative positions of input and output samples in an exemplary image-rescaling process.

Suppose that it is required to one-dimensionally re-sample a set of pixels of an image, where the relationship between input and output pixel positions is as shown in the graph of FIG. 3 by the line (30). In the description which follows the pixels will be described as samples, and particular input or output samples will be identified by the corresponding sequence numbers shown on the respective axes of FIG. 3. In FIG. 3 the input and output sample positions correspond respectively to the vertical and horizontal grids of lines, and the output sample positions increment downwards.

Note that the invention is applicable to situations where either or both of the input sampling frequency and the output sampling frequency are varying; the axes of FIG. 3 are calibrated in sample numbers and are normalised so that all sample pitches are represented by the same distance on the Figure.

Output samples 0 to 9 are interpolated samples, because the magnitude of the slope of the line (30) is greater than unity for these samples. And, output samples 10 to 13 in are decimated samples, because the magnitude of the slope of the line (30) is less than unity for these samples.

Figure 1:
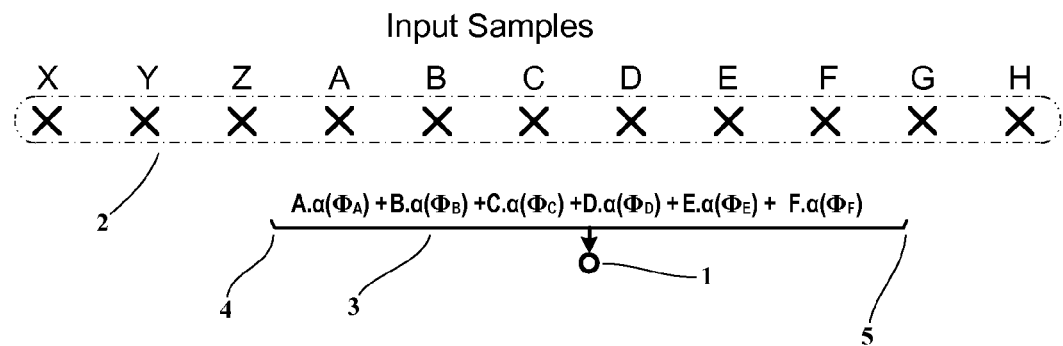
FIG. 1 shows the evaluation of new samples from a sequence of input samples by taking weighted sums of the values input samples falling within a FIR filter aperture.
Figure 2:
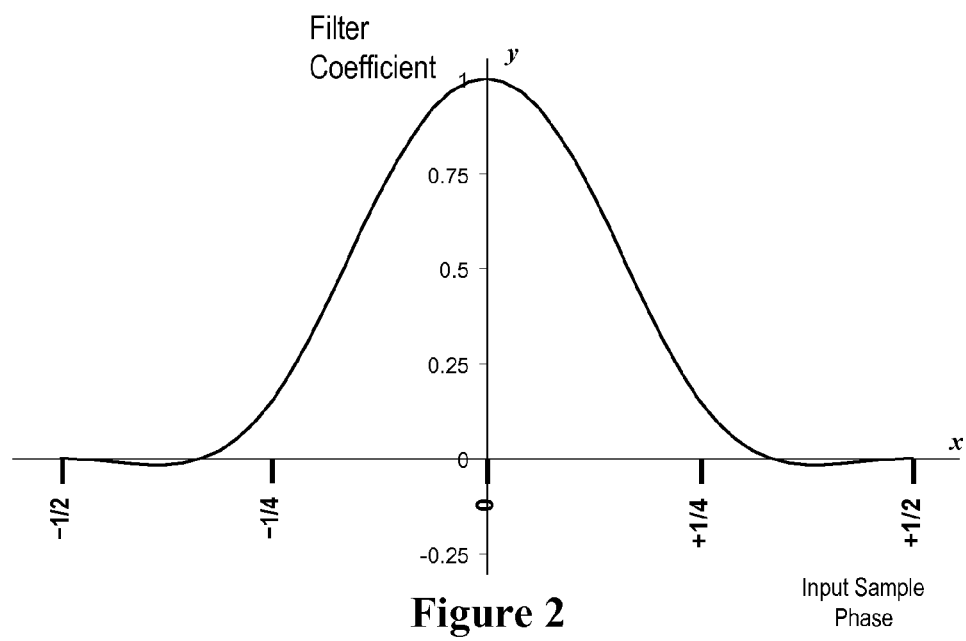
FIG. 2 shows an exemplary filter aperture for a re-sampling FIR filter.

Let us suppose that the interpolated values for output samples 0 to 9 can be evaluated, with acceptable alias rejection and pass-band frequency response, by the filter aperture function shown in FIG. 2 when its width is four input samples. This relationship between the aperture width and the input sampling frequency will define the filter cut-off frequency as some fixed proportion of the input sampling frequency.

Because the aperture is four samples wide, phase value +½ in FIG. 2 corresponds to an input sample position exactly two input sample pitches later than the required interpolated output sample; and later input samples are not required to contribute to output sample values. Similarly, input samples earlier than two input sample pitches before the required output sample position have phase values less than −½ and never contribute to output sample values.

Figure 4:
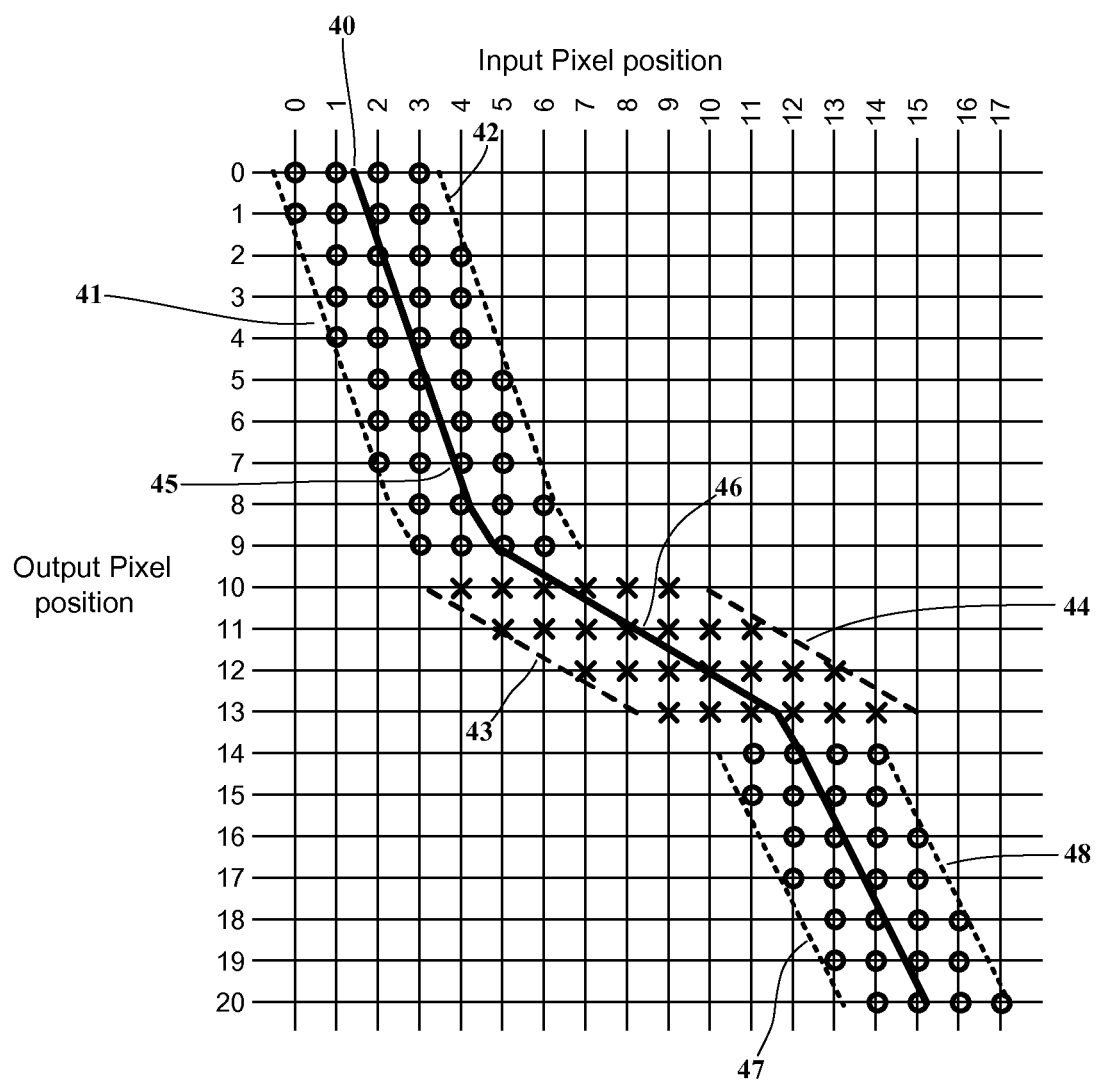
FIG. 4 shows contributing input pixel positions for the image-rescaling process of FIG. 3.

The limits of this four-input-sample-pitch-wide aperture function are shown by the lines (41) and (42) in FIG. 4, which is a copy of FIG. 3 with additional information added. Input samples that fall within these limits are marked by circles in FIG. 4. Thus, for example, output sample 7 is formed from a weighted sum of input samples 2, 3, 4 and 5. The sample weights are determined according to the phases of the respective input samples within the filter aperture with respect to the output sample position. This position is the intercept (45) of the input/output position graph (40) with the ordinate of output sample (7).

Output samples 14 to 20 are also interpolated samples, so they are evaluated using the four-input-sample-wide aperture in the same way as output samples 0 to 9. The contributing input samples are shown by circles in FIG. 4 and the limits of the aperture are shown by the lines (47) and (48).

Now consider the evaluation of the decimated output samples 10 to 13. These must be created with a filter that removes the alias due to the, lower frequency, output sampling. Such a filter will have a lower cut-off frequency than the filter that was used to interpolate samples 0 to 9, and its cut-off frequency is some proportion of the output sampling frequency. Widening the previously-used filter aperture to a width of four output sample pitches will achieve this.

The limits of this wider filter aperture are shown by the lines (43) and (44), and the input samples falling within the wider aperture are shown in FIG. 4 by crosses. Thus, for example, output sample 11 is formed from a weighted sum of input samples 5 to 11 inclusive. The respective input sample weights are determined according to their phases within the wider filter aperture with respect to the intercept (46) of the input/output position graph (40) with the ordinate of output sample (11).

Note that as the aperture has been widened to four output sample pitches, the number of input samples that contribute to each output sample has been increased, and their corresponding phase values are related to the output sample pitch.

In a resampling process it can be assumed that the required relationship between input and output sample positions is known. Determination of the filter phases of input samples that contribute to interpolated output samples is straightforward, and comprises expressing the position of each input sample relative to each output sample in units of input sample pitch, which is directly related to the aperture width. This information may come from a known frequency relationship between the input and output sampling frequencies, derived by known methods of phase measurement, or may be directly specified.

In order to implement a system, such as described above, in which the decimation aperture is a scaled version of the interpolation aperture, it is advantageous to use the same relationship data that was used to calculate interpolation phase to calculate the decimation phase for input samples that contribute to decimated output samples. A suitable method is illustrated in FIG. 5.

Figure 5:
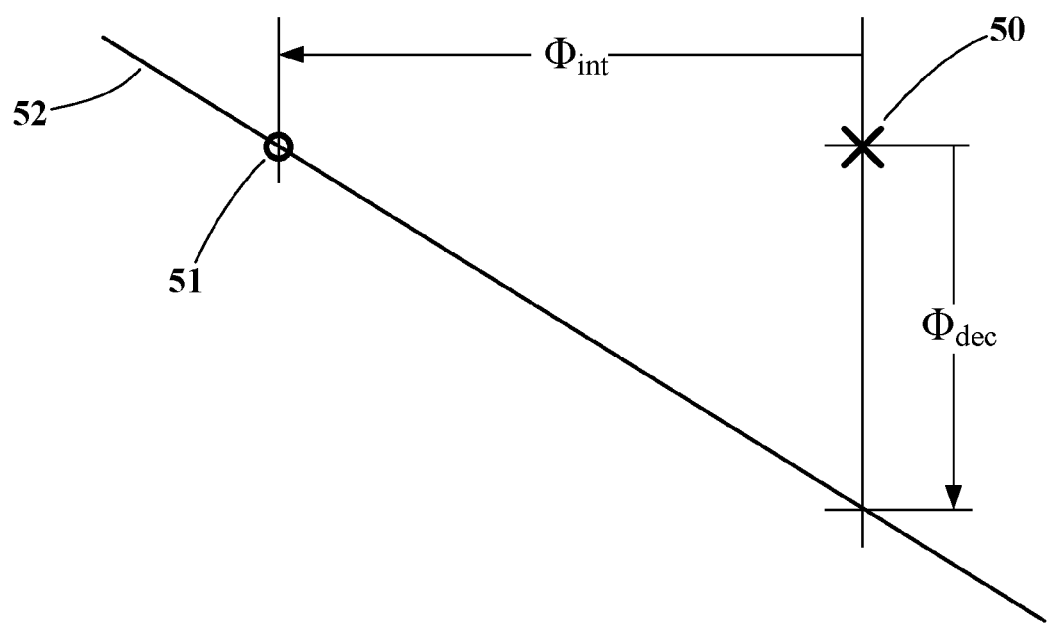
FIG. 5 shows a method of determining the phase of an input sample within a decimation filter aperture.

Referring to FIG. 5, an input sample (50) contributes to an output sample (51). If the output sample is an interpolated sample, the interpolation phase $\phi_{int}$ is represented in the Figure by the horizontal distance to the output sample (51) from the input sample (50), expressed in units of input sample pitch. The corresponding position within an N-input-sample-wide filter aperture is given by $\phi_{int}/N$; this value is the relevant x co-ordinate in FIG. 2.

If the output sample is a decimated sample, the decimation phase $\phi_{dec}$ is this same distance, but expressed in units of output sample pitch. This rescaling can be achieved by drawing the line (52), having a slope equal to the ratio of the output sample frequency to the input sample frequency, through the output sample (51). $\phi_{dec}$ is then represented by the vertical distance between the input sample (51) and the line (52). However, very often, the instantaneous slope of the relationship between the input and output sampling frequencies is not known because the relevant phase data is sampled.

The inventor has appreciated that the graph of FIG. 3 may be used to obtain the values of $\phi_{dec}$ and $\phi_{int}$. The graph (30) has a slope equal to the ratio of output sampling frequency to input sampling frequency, and points at the intersections of the grid in FIG. 3 correspond to particular input to output sample relationships. Provided that this frequency ratio is constant between the output sample time and the input sample time, the values of the interpolation phase $\phi_{int}$ and the decimation phase $\phi_{dec}$ for the contribution of a particular input sample to a particular output sample are equal to the horizontal distance between that sample and the graph (30), and the vertical distance between that sample and the graph (30), respectively.

Figure 6:
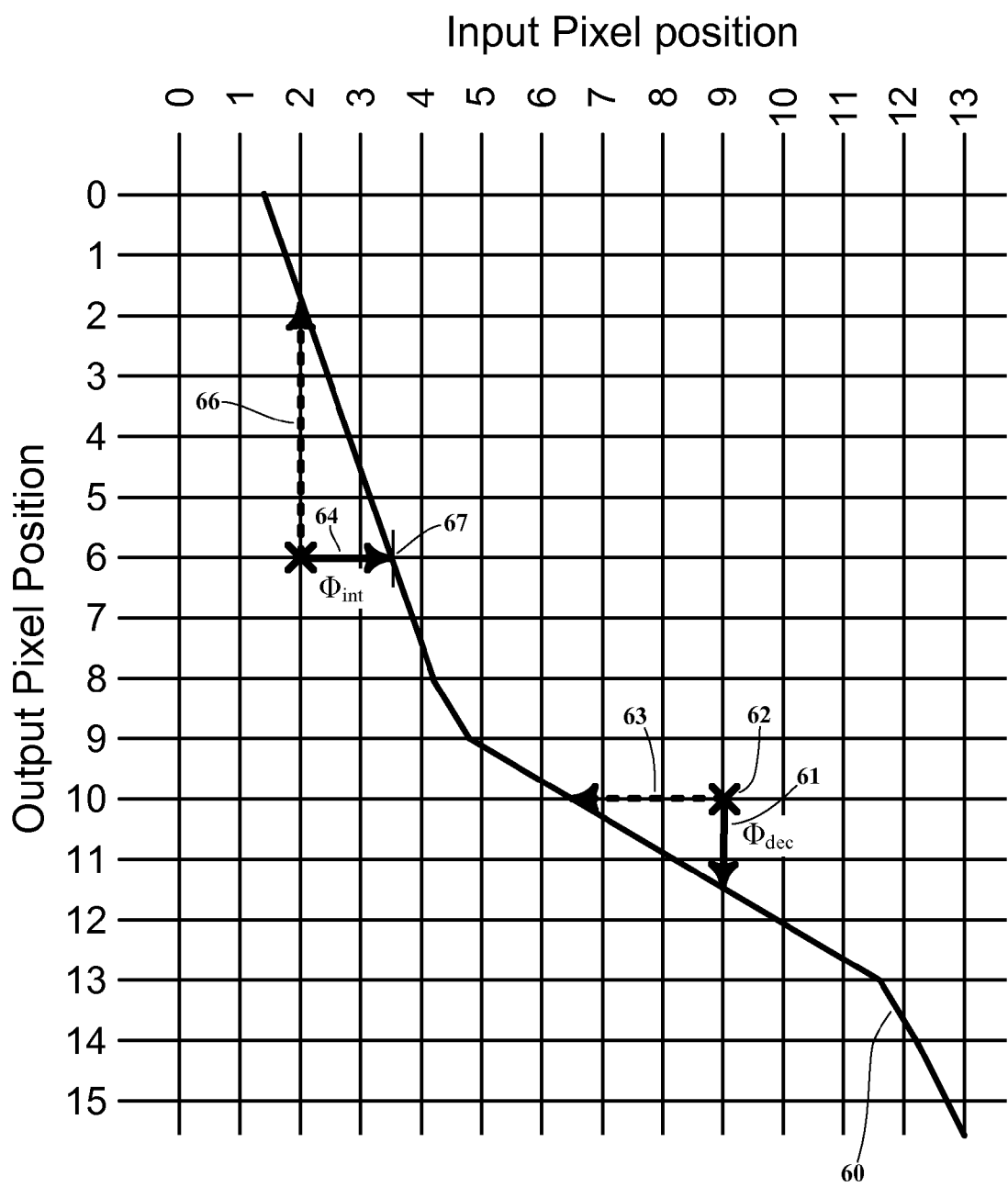
FIG. 6 shows the determination of filter aperture phase for two exemplary input sample contributions in the image-rescaling process of FIG. 3.

An example of the application of this principle is shown in FIG. 6, which is an enlarged copy of part of the input to output sample relationship graph of FIG. 3. The aperture phase required to determine input sample 9's contribution to the decimated output sample 10 is shown at (61). The required decimation phase on a scale of output pixel pitches is the vertical distance to the input/output relationship graph (60) from the point (62) having the Cartesian co-ordinates of the respective input and output sample positions.

Now consider the interpolated output sample 6. Its interpolation phase on a scale of input pixel pitches is the horizontal distance (64) to the input/output relationship graph (60) from the point (65) having the Cartesian co-ordinates of the respective input and output sample positions.

Note that if output sample (10) had been an interpolated sample, the phase would have been the horizontal distance (63) to the input/output relationship graph (60) from the point (62) which is greater than the decimation phase (61). And, if output sample 6 had been a decimated sample, its decimation phase would be the vertical distance (66), which is greater than the interpolation phase (64).

It can thus be seen that the required filter aperture phase for any combination of input and output sample positions is whichever is the shorter of the horizontal and vertical distances to the input/output relationship graph (60) from the point on the graph corresponding to the respective input and output sample co-ordinates. This shorter distance can be used as the argument of a common aperture function for interpolation and decimation without the need to determine in advance whether a particular sample is interpolated or decimated.

Figure 7:
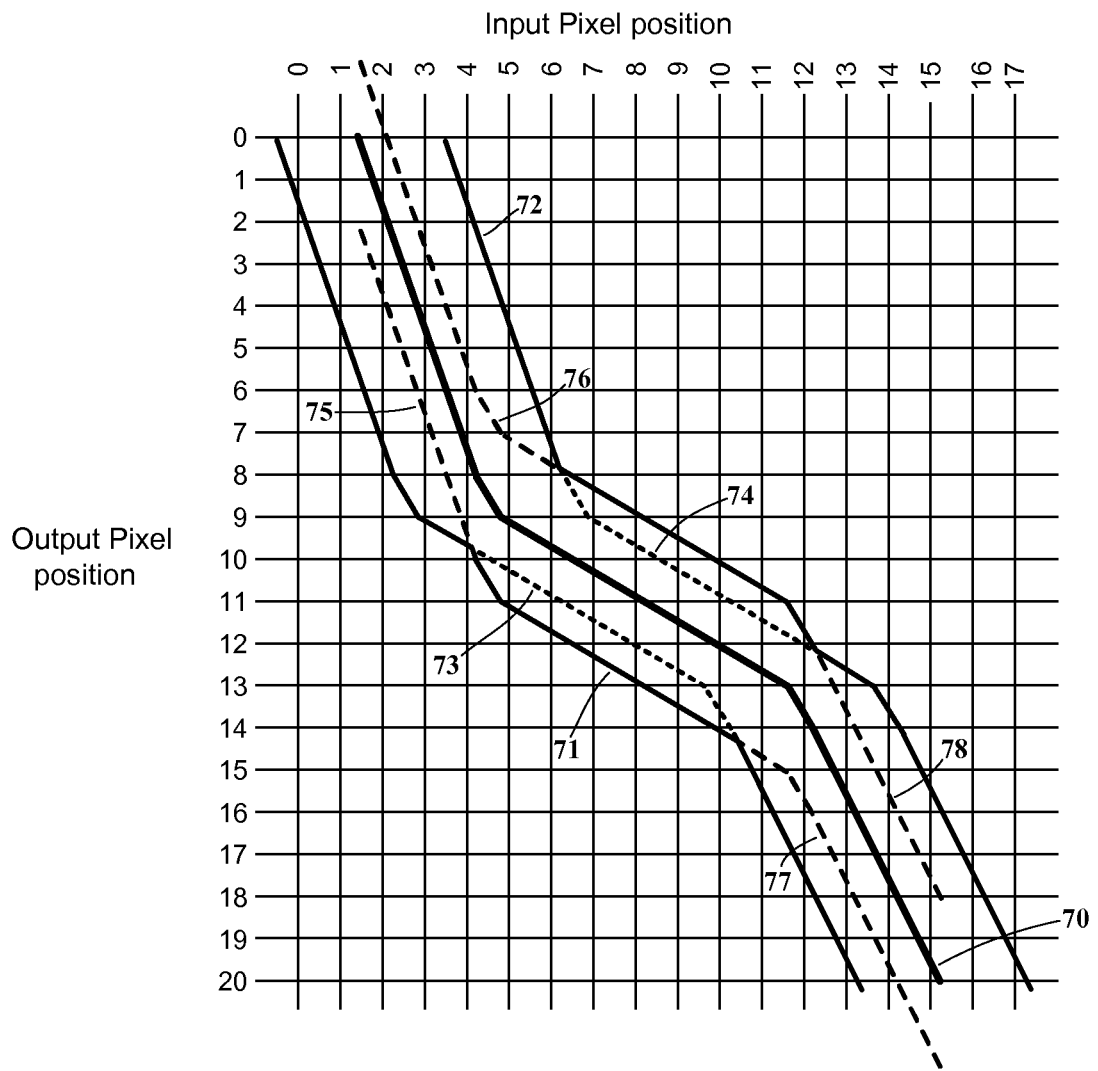
FIG. 7 shows the limits of a resampling filter aperture according to an embodiment of the invention.

FIG. 7 shows the limit of a four-input-sample-wide interpolation aperture and a four-output-sample-wide decimation aperture derived from the above principle and applied to the complete set of 20 output samples shown in FIG. 3. The limits of the combined aperture are shown by the solid lines (71) and (72). The dotted lines (73) and (74) show where an interpolation aperture would be narrower than the combined aperture; and, the dotted lines (75) (76) (77) and (78) show where a decimation aperture would be narrower than the combined aperture. The combined aperture that is used to determine the weights to be applied to the input samples is whichever of the two possible apertures (the interpolation aperture and the decimation aperture) is wider, and thus includes more contributing input samples.

The combined aperture limits (71) (72) are the same as those shown in FIG. 4 when the input to output frequency difference is constant, but they differ at the points where the slope of the graph changes. Taking the minimum phase at every input/output sample combination has the effect of 'smoothing' the transitions between the two different aperture widths.

A system for carrying out a resampling process according to the above principles will now be described. To evaluate each output sample the system must determine: which input samples are required to contribute to that output sample; whether an input-sample-rate-related aperture width, or an output-sample-rate-related aperture width should be used; and, the phase of the input sample with respect to the selected aperture. The appropriate weights for the contributing input samples must then be determined from their respective phase values and the aperture function, and these weights must be summed to obtain the output sample values.

The process may be summarised as follows:
For every combination of input and output sample positions, analyse the required relationship between input and output sample positions to determine:
The numerical value of the distance in input sample pitches between the position with respect to the input samples of the contributing input sample and the position with respect to the input samples of the output sample receiving the respective contribution; and,
The numerical value of the distance in output sample pitches between the position with respect to the output samples of the contributing input sample and the position with respect to the output samples of the output sample receiving the respective contribution.
Use the smaller of these two numerical values as the argument of a filter aperture function that defines the contribution of the input sample to the output sample.
The argument shall be negative when the input sample position is earlier than the output sample position; and,
The argument shall be positive when the input sample position is later than the output sample position.
Evaluate the value of each output sample by summing the contributions of all input samples to that output sample.

Figure 8:
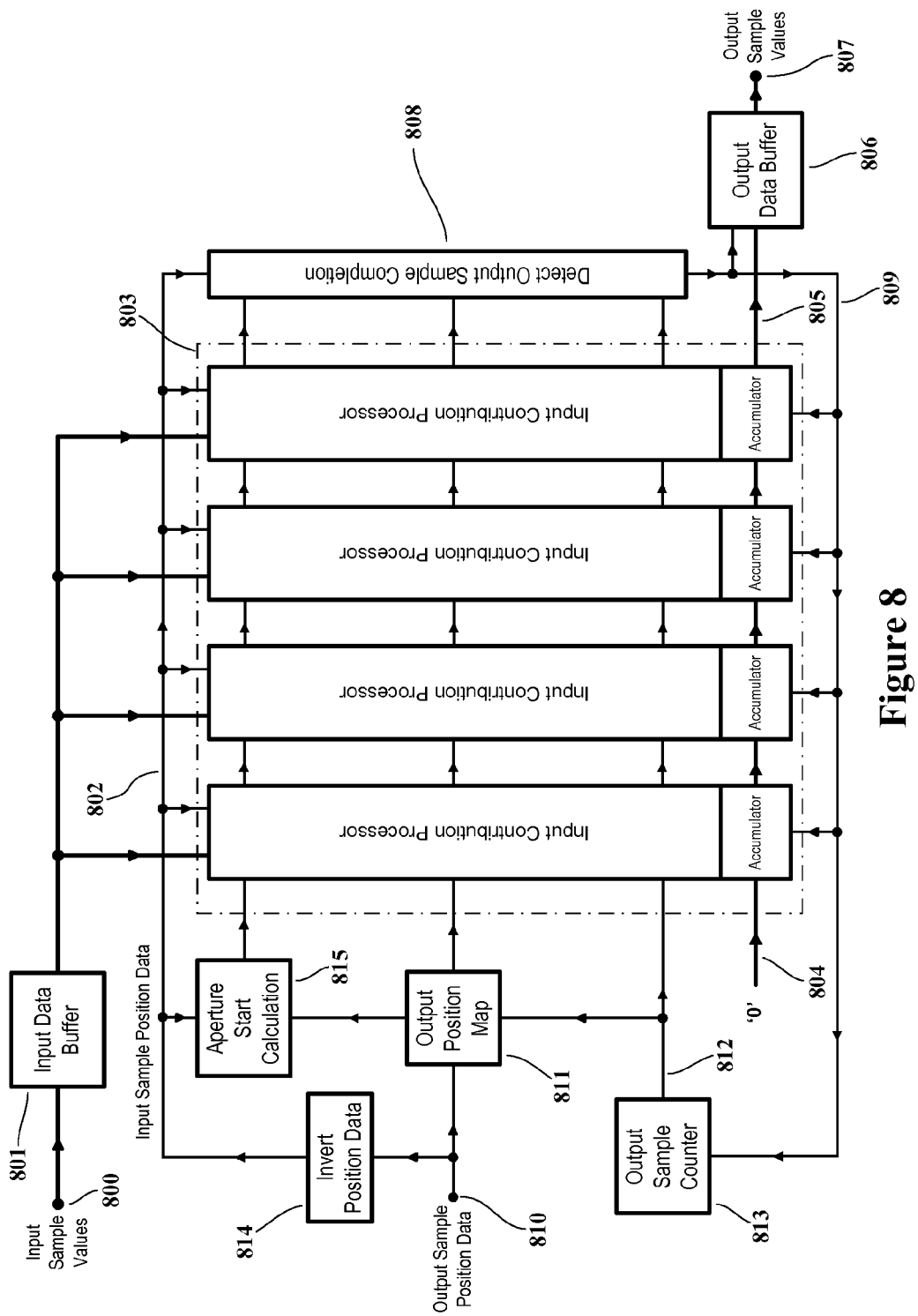
FIG. 8 shows a block diagram of a re-sampling system according to an embodiment of the invention.

FIG. 8 shows a block diagram of a hardware system that implements an exemplary embodiment of the invention. Input sample values (800) are input to an input data buffer store (801) that receives the values at the input sample rate and outputs sample values to a set of input contribution processors (803). The illustrated example has four processors, less or more than this number can be used, and this will be discussed further below. Each of the processors is associated with an accumulation register that accumulates weighted input sample values under the control of the associated processor. The accumulation registers are connected in cascade to form an output data pipeline. The start (804) of the output data pipeline receives zero value data, and each processor passes accumulated values to the succeeding accumulation register. At the end (805) of the output data pipeline the final accumulation register passes its accumulated values to an output data buffer (806), whose output provides output sample values (807) at the output data rate.

The calculation of output sample values by the set of input contribution processors (803) will be described in below. An output sample completion test block (808) determines when an output sample value is available at the end (805) of the output data pipeline and generates a pipeline shift control signal (809) when a completed sample value is available. This control signal causes data to shift one stage along the output data pipeline and to load the newly-calculated output sample into the output data buffer (806).

The system receives output sample position data (810) that defines the position of each output sample with respect to the input sample structure. At least a portion of this data is stored in an output position map store (811). This map store is addressed by the output (812) of an output sample counter (813), which is incremented on each occurrence of the pipeline shift control signal (809).

As summarised above, the method of the invention requires data defining the positions of input samples with respect to the output sampling structure. This is the inverse of the relationship defined by the output sample position data (810), and is derived from that data by a position-data inversion block (814).

For example, to find the interpolation phase value (64) in FIG. 6, it is necessary to find the input sample position of the intercept (67) of the position of output sample 6 with the graph (60). The output position data (810) describes the positions of input samples 3 and 4, which lie on each side of intercept point (67). Therefore the position of the intercept (67) can be determined by interpolation as follows.

The output sample position data (810) comprises a set of output sample positions p(o) for corresponding output samples o. The values p(o) are in units of input sample pitch, and values are available for integer values of o, which is in units of output sample pitch.

To determine the input sample position q(i) corresponding to input sample i, the given values of p(o) are searched to locate the pair of values of p(o) nearest below and nearest above i, then:
Let the i values corresponding to these p(o) values be $i_1$ and $i_2$ respectively.
Then:

$$q(i)=i_1+(i-i_1)/(i_2-i_1)$$

The above equation is a linear interpolation that determines a new input sample position between the input sample positions $i_1$ and $i_2$ that are included in the output sample position data (810). The skilled person will appreciate that higher-order or lower-order interpolation may be used. It is also possible that the required position may be available directly from the output sample position data (810).

The inverse data comprising the q(i) values for integer values of i is passed, via an input sample position data bus (802), to all members of the set of input contribution processors (803).

At any particular instant each member of the set of processors (803) is calculating the contribution of a particular input sample to a particular output sample. Succeeding processors correspond to succeeding output samples so that, in the example shown in FIG. 8, a block of four adjacent output samples is being constructed simultaneously. As mentioned previously, data is transferred from each stage to the next as each completed output sample is output from the end (805) of the data pipeline. If no more than four input samples contribute to each output sample, then one contribution is added at each stage. However, if more than four input samples contribute, then more than one input contribution is accumulated at each stage before the data is shifted along the pipeline.

Figure 9:
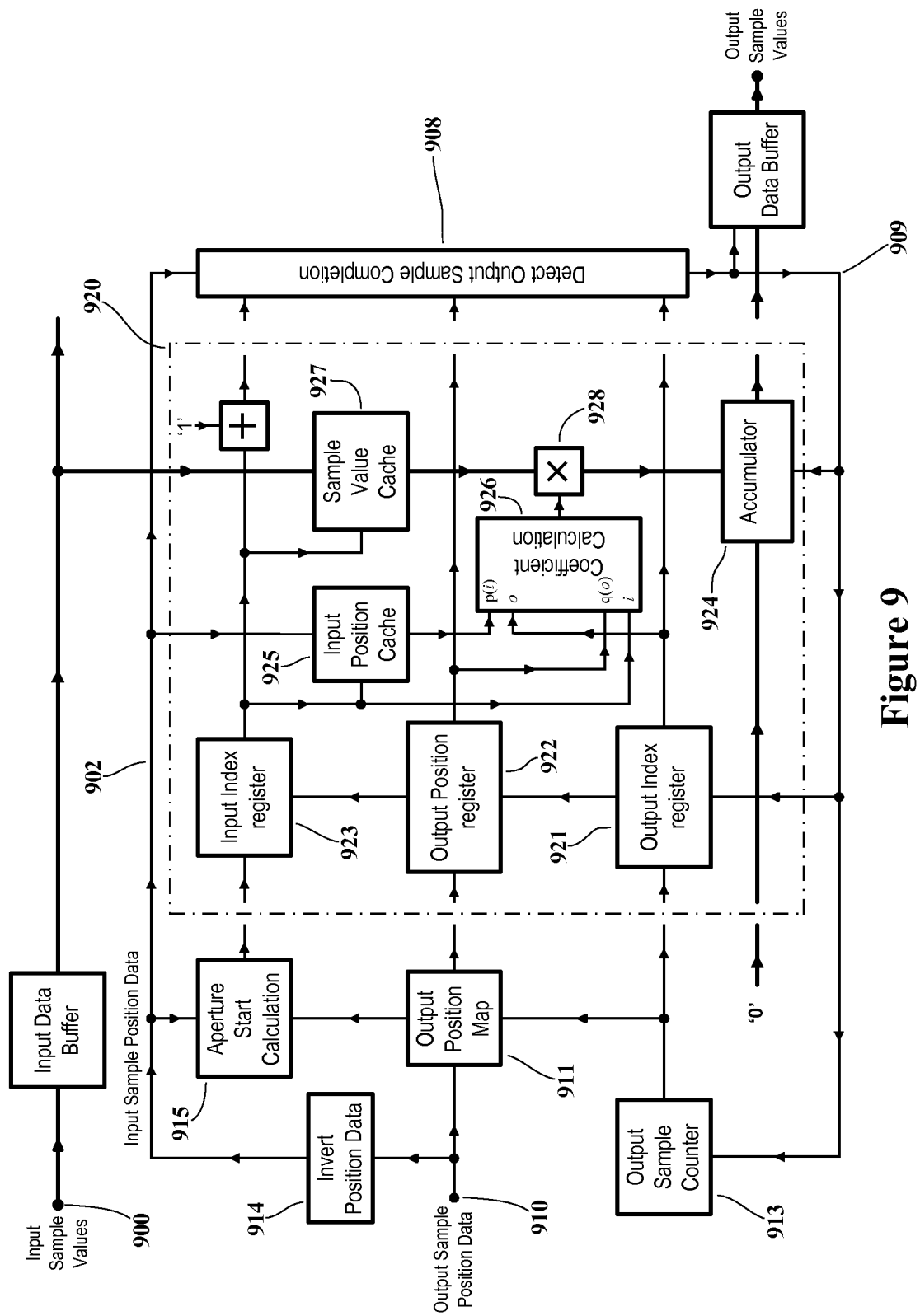
FIG. 9 shows the a more-detailed block diagram of the system of FIG. 8.

FIG. 9 shows a more detailed block diagram of the system of FIG. 8 including the operation of one of the input contribution processors. Only one processor (920) is shown; all the processors are identical and the outputs from each are connected to corresponding input of the next, with the first inputs and the last outputs connected as shown in FIGS. 8 and 9.

Consider the case of the first processor located at the start of the data pipeline. The calculation of an output sample value is initiated by the pipeline shift control signal (909). An output sample value from the output sample counter (913) is loaded into an output index register (921), and the corresponding output sample position from the output sample position map (911) is loaded into an output position register (922). An aperture-start calculation block (915), uses the output position data from the output position map (911) and the input sample position data from the position-data inversion block (914) to determine the position of the earliest input sample that is required to contribute to the output sample defined by the state of the output sample counter (913). The position of this sample is loaded into an input index register (923). And, the value zero is loaded into the accumulator (924).

An input position cache (925) stores part of the input sample position data from the position-data inversion block (914); it is addressed by the input sample position value from the input index register (923), and outputs the position of that input sample.

A coefficient calculation block (926) calculates the weight to be applied to the contribution of the input sample defined by the input index register (923) to the output sample defined by the output index register (921). The calculation is as follows:

The interpolation phase is given by:

$$\phi_{int} = i - q(o)$$

The decimation phase is given by:

$$\phi_{dec} = p(i) - o$$

The filter aperture function argument is:

$$\phi \div N$$

Where: $\phi$ is whichever of $\phi_{int}$ or $\phi_{dec}$ has the smaller magnitude; and,
N is the width of the filter aperture in units of sample pitch.

The coefficient calculation block (926) receives:
the value of i from the input register (923);
the value of q(o) from the output position register (922);
the value of p(i) from the input position cache (925);
the value of o from the output index register (921);
and uses these values to calculate the filter aperture address value, which it applies to an aperture look-up table to determine the weight for the contribution of input sample i to output sample o.

The value of i from the input index register (923) also addresses an input sample value cache (927) that stores part of the set of input sample values (900). The output from input sample value cache (927) is the value of input sample i, and this is applied to a multiplier (928) that multiplies it by the contribution weight from the coefficient calculation block (926). The resulting weighted sample value is accumulated in the accumulator (924).

If no pipeline shift control signal (909) is received, the input index register (923) is incremented and the next input sample is delivered from the input sample value cache (927), weighted in the multiplier (928) with the appropriate weight from the coefficient calculation block (926), and its weighted value accumulated in the accumulator (924). If no pipeline shift control signal (909) is received, this process repeats for the next input sample.

When a pipeline shift control signal (909) is received, the content of the accumulator (924) is shifted into the accumulator of the next stage of the output data pipeline, replacing that accumulator's content, which is itself shifted to its succeeding stage.

The pipeline shift control signal (909) also causes each stage to output three control parameters to the succeeding stage:

The value of the input index register (923) is increased by one in an adder (928) and loaded into the input index register of the succeeding stage;

The output position q(o) from the output position register (922) is loaded into the output position register of the succeeding stage; and, The value of the output index register (921) is loaded into the output index register of the succeeding stage.

The final stage inputs these three signals to the output sample completion test block (908), which calculates the filter aperture address value for the next input sample exactly as if the output sample completion test block (908) were another input contribution processor stage. If this filter aperture address value is greater than +½, which would indicate that the next input sample would be outside the filter aperture, then a pipeline shift control signal (909) is generated. This causes the output sample counter (913) to increment, and the first input contribution processor, at the start of the output data pipeline, calculates the earliest contribution to a new output sample value.

Figure 10:
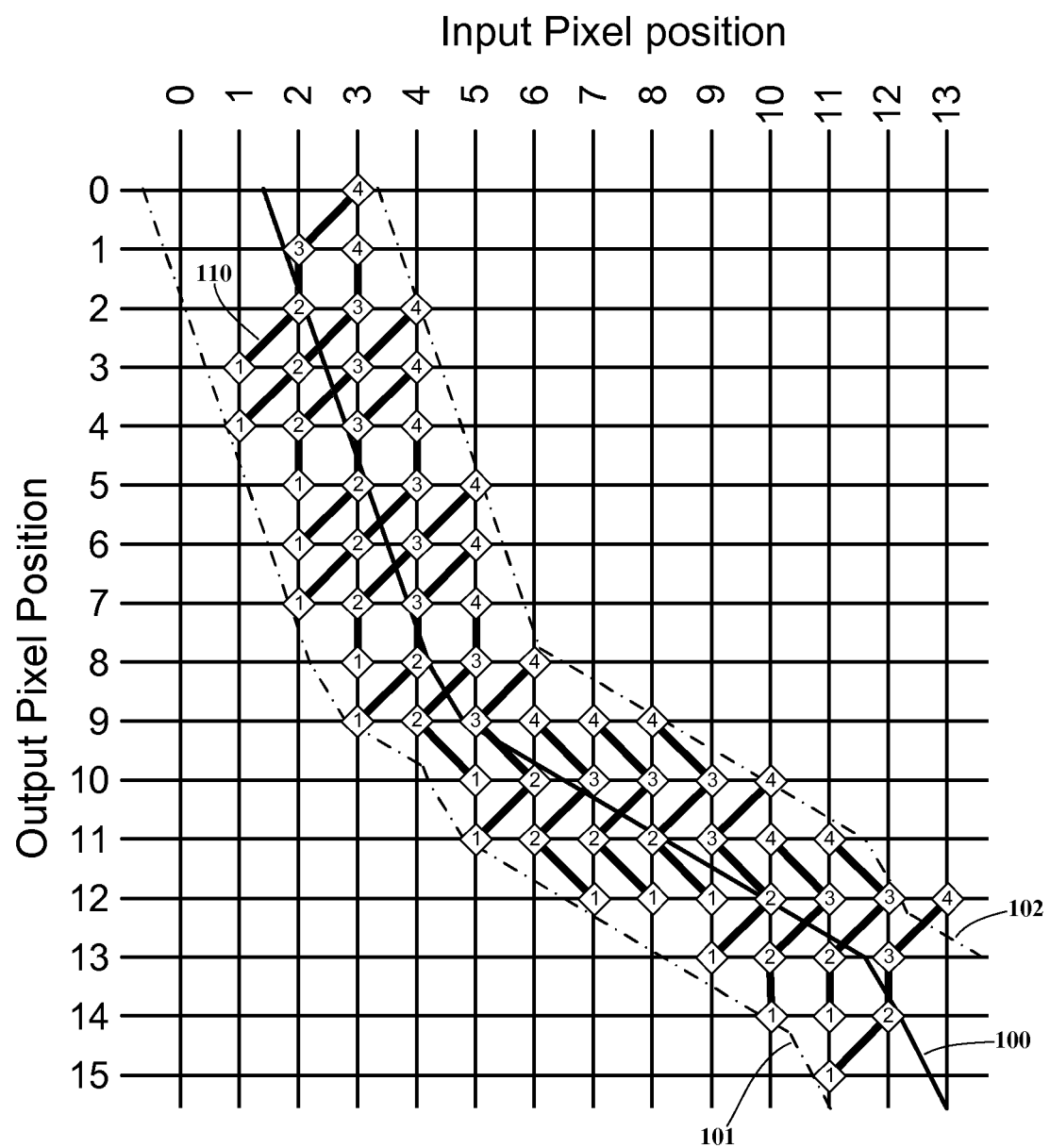
FIG. 10 shows how the resampling process of FIG. 3 is carried out by the system of FIG. 8.

An example of the way the different stages of the pipeline are used to evaluate different contributions is illustrated in FIG. 10. This shows how the exemplary resampling operation of FIG. 6 is implemented using a four-sample-wide filter aperture and a four stage pipeline. The required input to output sample relationship is shown by the line 100, and the limits of the aperture are shown by the chain lines (101) and (102). Input samples whose contributions are evaluated are indicated by a diamond containing a number that identifies the stage of the pipeline that evaluates that contribution. Evaluations that take place concurrently are linked by thick lines, for example, the line (110).

Ignoring the question of initialisation of the process which will be discussed later, consider first the contribution of input sample 1 to output sample 3. This is evaluated in processor 1, which is at the start of the output data pipeline. Concurrently, as indicated by the line (110), processor 2 is evaluating the contribution of input sample 2 to output sample 2; processor 3 is evaluating the contribution of input sample 2 to output sample 1; and, processor 4 is evaluating the contribution of input sample 3 to output sample 0. Because processor 4's next input sample, which is input sample 4, is outside the filter aperture, the output data pipeline shifts once the contributions have been evaluated and added to accumulators at the respective pipeline stages.

After this shift, processor 1 evaluates the contribution of input sample 1 to output sample 4; processor 2 evaluates the contribution of input sample 2 to output sample 3; processor 3 evaluates the contribution of input sample 3 to output sample 2; and, processor 4 evaluates the contribution of input sample 3 to output sample 1. Again, processor 4's next input sample is outside the filter aperture and so the pipeline shifts once these contributions have been evaluated and accumulated in the respective accumulators.

The process continues in similar way until, after four processing steps, the contributions of input samples 1 to 4 inclusive to output sample 3 have all been evaluated and the accumulator of processor 4 contains the sum of these four contributions. At the next pipeline shift this interpolated sample value is shifted into the output data buffer.

Note that the output samples in the above description are interpolated samples, so that, because the width of the aperture is equal to the number of processing stages, the pipeline shifts at input sample rate. Where the output samples are decimated samples, for example output samples 10 to 12, the pipeline shifts less frequently, and there are several instances of a processor stage accumulating more than one input sample contribution before shifting to a new output sample.

This means that the processor stages, and the output sample completion test block (908), operate at a higher clock rate than the output sample rate. These differences between the processors' clock rate and the input and output data rates are made possible by input data buffer (901) and the output data buffer (906) respectively.

The aperture start calculation (915) makes use of the output position data from the output position map (911), and input position data from the position-data inversion block (914). The output position data is used to find the earliest input sample for which $\phi_{int}$ is smaller than half the aperture width; and, the inverse position data is used to find the earliest input sample having $\phi_{dec}$ less than half the aperture width for that output sample. The earlier of these samples is the start of the aperture, and the corresponding i value is output to the input index register (923) of the first input contribution processor.

If the first few output sample values can be ignored, then initialisation will take place automatically provided later processor stages do not have earlier input sample index values than earlier processor stages. The aperture start block (915) ensures that the first processing stage will always start to construct a valid output sample, and once that value has propagated to the end of the pipeline, with the appropriate other contributions to that sample, it will be output as a valid output sample value, and all subsequent output sample values will also be valid.

In the example described above the width of the filter aperture in units of pixel pitch is equal to the number of processing stages. This has the advantage that, when decimating, the input contribution processing stages operate at the input sample rate. If fewer processing stages had been used, those stages would have to operate at a faster rate; and, if more stages had been used, some of them would be 'wasted' in evaluating samples lying outside the filter aperture. Similarly, when decimating, a longer pipeline enables the processors to run at a slower rate. Therefore when designing a system for a particular application it is possible to make a 'trade-off' between processing speed and hardware complexity.

In the system of FIGS. 8 and 9, the required relationship between input sample positions and output sample positions is specified in such a way that the distance in input sample pitches between respective contributing input samples and respective output samples receiving the contribution is directly available from the output sample position data (810). And, the distance in output sample pitches is obtained by 'inversion' of this data using linear interpolation.

In some applications the required relationship between input sample positions and output sample positions may be expressed as the positions of input samples with respect to the output sample positions. This is the inverse of the situation described the above and so the distance in output sample pitches between respective contributing input samples and respective output samples receiving the contribution is directly available. And, the distance in input sample pitches can be obtained by 'inversion' of the position relationship data using linear interpolation.

Alternatively the required relationship between input sample positions and output sample positions may be expressed in such a way that both the positions of input samples relative to output samples and the positions of output samples relative to input samples are directly available.

The invention thus provides an efficient and flexible system for re-sampling data where the relationship between the input sample pitch and the output sample pitch can be varied at will on a sample-by-sample basis. The same processing system is used for interpolation as for decimation, and transitions between interpolation and decimation introduce no artefacts or errors.

Other implementations of the invention are possible. For example, other methods of calculating the 'inverse' sample position data may be used. The aperture function may differ from that shown in FIG. 4, and by detecting whether $\phi_{int}$ or $\phi_{dec}$ is the smaller, it would be possible to use different aperture look-up tables for interpolation and decimation respectively.

The skilled person will choose appropriate implementations for the operations described above and suitable numbers of bits to represent the various data values, including: intermediate values, filter coefficient values and phase values having regard to the type of data being processed and the required performance of the system.

In an important example, the method and apparatus according to the invention can be used to resample images or a sequence of images such as video. Whilst a one dimensional re-sampling has been described, it is understood that—for example—horizontal and vertical spatial resampling processes can be combined.

Resampling apparatus can be provided according to the invention which is capable of both interpolation (resampling to a higher sampling frequency) and decimation (resampling to a lower sampling frequency). That apparatus may move smoothly from interpolation to decimation (or vice versa), for example within an image or within a sequence of images.

The invention claimed is:

1. A method of processing samples in a digital sample processor, the method comprising the steps of:
   receiving a stream of input samples at respective input sample positions;
   specifying output sample positions according to a specified temporal or spatial relationship between input sample positions and output sample positions;
   deriving values for new output samples at respective output sample positions from the values of said stream of input samples by summing weighted values of input samples situated within a filter aperture;
   wherein the weight applied to the value of each input sample depends on the phase of that input sample within the said filter aperture, and the relationship between the said input sample phase and the said weight is defined by a filter aperture function in which the value of the function is the said weight and the argument of the function is the said phase; and wherein the width of the said filter aperture is scaled according to either the input sampling frequency or the output sampling frequency so as to obtain the wider of the two possible filter apertures.

2. A method according to claim 1 in which the argument of the aperture function is obtained by taking the numerically smaller value of:

the distance in input sample pitches between the position with respect to the input samples of the contributing input sample and the position with respect to the input samples of the output sample receiving the respective contribution, and the distance in output sample pitches between the position with respect to the output samples of the contributing input sample and the position with respect to the output samples of the output sample receiving the respective contribution.

3. A method according to claim 2, in which the said the distance in output sample pitches between the position of the contributing input sample and the position of the output sample receiving the respective contribution is determined as the difference between the output sample position and the required output sample position determined from the position of the contributing input sample according to the said specified temporal or spatial relationship between input sample positions and output sample positions.

4. A method according to claim 2, in which the said the distance in input sample pitches between the position of the contributing input sample and the position of the output sample receiving the respective contribution is determined as the difference between the input sample position and the required input sample position determined from the position of the output sample receiving the contribution according to the said specified temporal or spatial relationship between input sample positions and output sample positions.

5. A method according to claim 2, in which data values representing the said specified temporal or spatial relationship between input sample and output sample positions are interpolated so as to obtain intermediate sample positions between specified sample positions.

6. A method according to claim 1, in which contributions of input sample values to output sample values are accumulated in members of a serially-connected fixed-length chain of accumulators.

7. A method according to claim 6, in which accumulated values are passed along the chain at the output sample rate.

8. Resampling apparatus comprising:
a terminal configured to receive a stream of input samples at respective input sample positions; and
a resampling filter deriving new output samples at respective output sample positions having a specified temporal or spatial relationship with said input sample positions from the values of a stream of input samples by summing weighted values of input samples situated within a filter aperture such that the weight applied to the value of each input sample depends on the phase of that input sample within the said filter aperture, and the relationship between the said input sample phase and the said weight is defined by a filter aperture function in which the value of the function is the said weight and the argument of the function is the said phase; wherein the width of the said filter aperture is scaled according to either the input sampling frequency or the output sampling frequency so as to obtain the wider of the two possible filter apertures.

9. Apparatus according to claim 8, in which the argument of the aperture function is obtained by taking the numerically smaller value of:

the distance in input sample pitches between the position with respect to the input samples of the contributing input sample and the position with respect to the input samples of the output sample receiving the respective contribution; and the distance in output sample pitches between the position with respect to the output samples of the contributing input sample and the position with respect to the output samples of the output sample receiving the respective contribution.

10. Apparatus according to claim 9, in which the said the distance in output sample pitches between the position of the contributing input sample and the position of the output sample receiving the respective contribution is determined as the difference between the output sample position and the required output sample position determined from the position of the contributing input sample according to the said specified temporal or spatial relationship between input sample positions and output sample positions.

11. Apparatus according to claim 9, in which the said the distance in input sample pitches between the position of the contributing input sample and the position of the output sample receiving the respective contribution is determined as the difference between the input sample position and the required input sample position determined from the position of the output sample receiving the contribution according to the said specified temporal or spatial relationship between input sample positions and output sample positions.

12. Apparatus according to claim 9 in which data values representing the said specified temporal or spatial relationship between input sample and output sample positions are interpolated so as to obtain intermediate sample positions between specified sample positions.

13. Apparatus according to claim 8, in which contributions of input sample values to output sample values are accumulated in members of a serially-connected fixed-length chain of accumulators.

14. Apparatus according to claim 13 in which accumulated values are passed along the chain at the output sample rate.

15. An image processor having resampling apparatus comprising:
a terminal configured to receive a stream of input samples at an input sampling frequency;
a resampling filter adapted to provide a stream of output samples at an output sampling frequency by summing weighted values of input samples situated within a filter aperture; and
an output sampling frequency selector for selecting an output sampling frequency which can be higher or lower than the input sampling frequency;
wherein the weight applied to the value of each input sample in the resampling filter depends on the phase of that input sample within the said filter aperture, and the relationship between the said input sample phase and the said weight is defined by a filter aperture function in which the value of the function is the said weight and the argument of the function is the said phase; and wherein the width of the said filter aperture is scaled according to either the input sampling frequency or the output sampling frequency so as to obtain the wider of the two possible filter apertures.

16. A processor according to claim 15, in which the output sampling frequency is selectively variable between a frequency which is higher than the input sampling frequency and a frequency which is lower than the input sampling frequency.

17. A processor according to claim 15 in which a change may be made within an image or within a sequence of images from an output sampling frequency which is higher than the input sampling frequency to an output sampling frequency which is lower than the input sampling frequency.

* * * * *